Inventor
Ralph C Roe

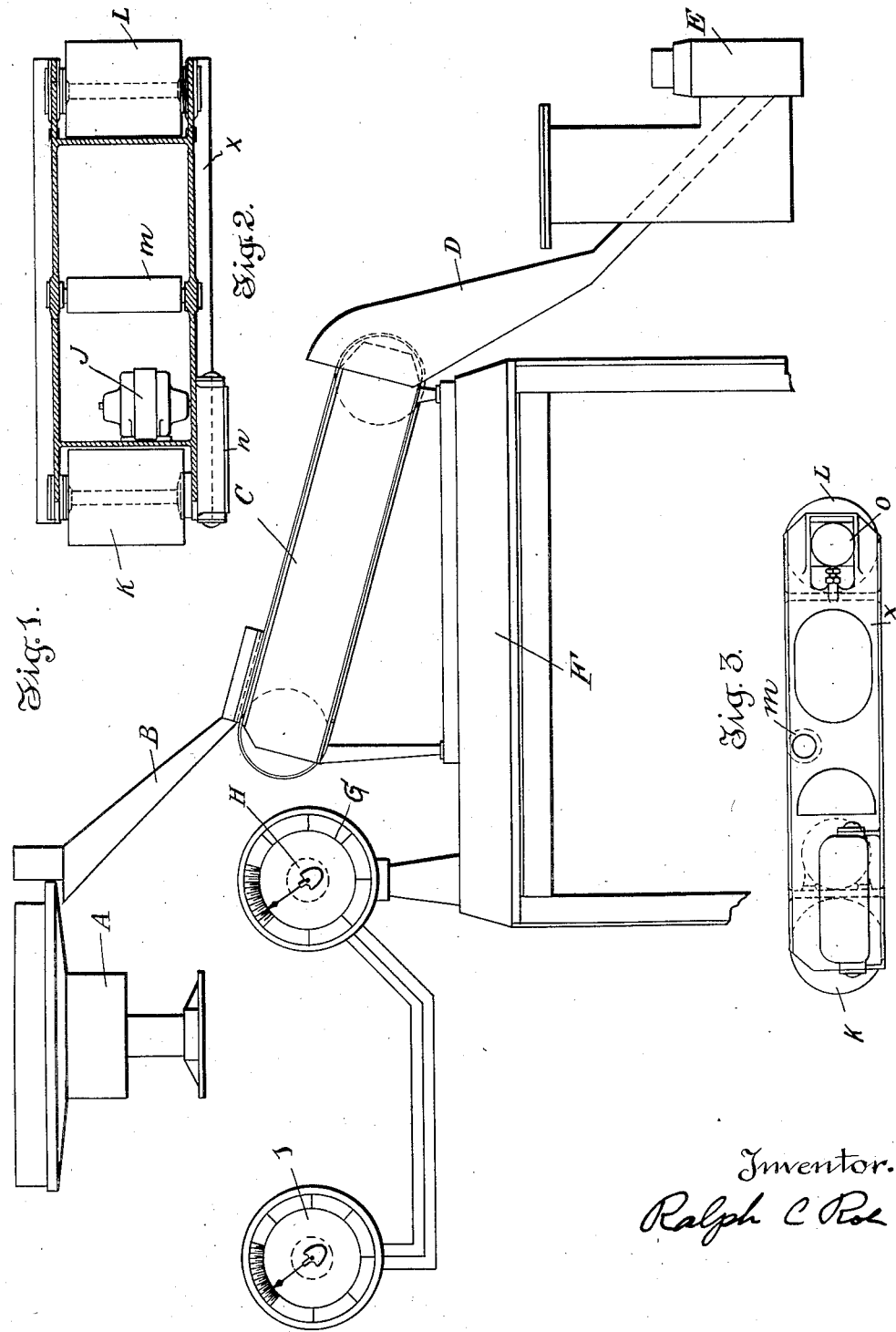

Nov. 1, 1932.  R. C. ROE  1,885,378
WEIGHING MACHINE
Filed Feb. 5, 1929  3 Sheets-Sheet 3
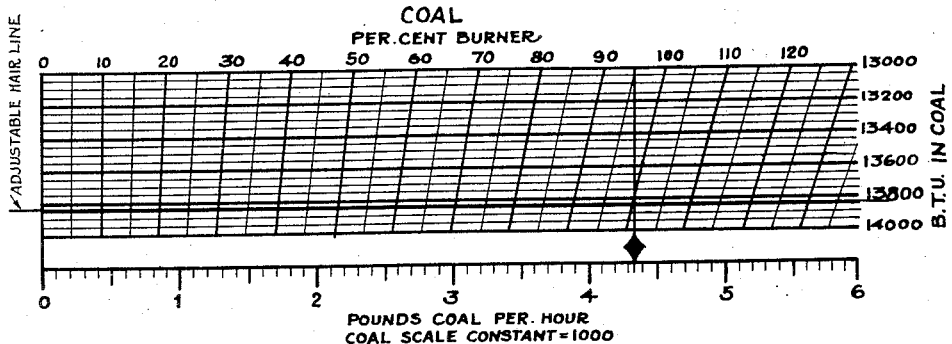
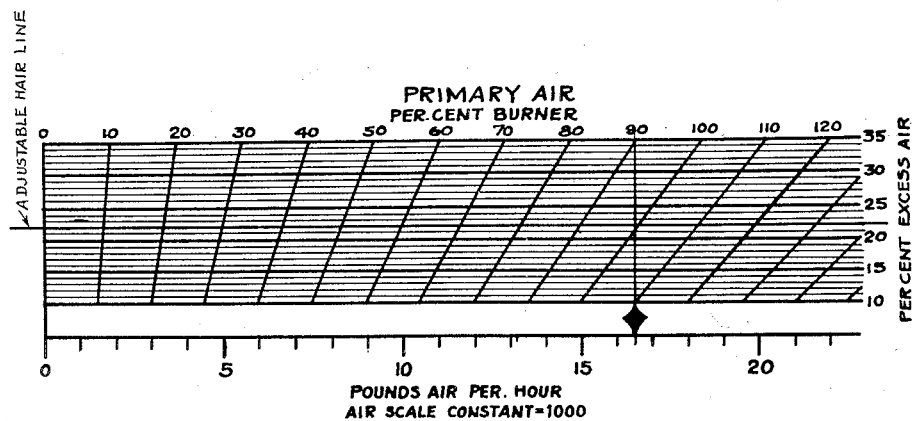
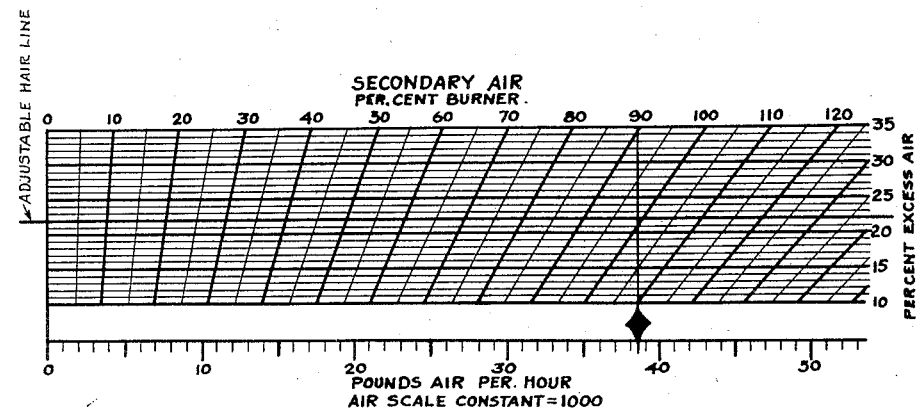
Fig. 11.  Fig. 10.
Inventor:
Ralph C Roe Patented Nov. 1, 1932

1,885,378

UNITED STATES PATENT OFFICE

RALPH C. ROE, OF ENGLEWOOD, NEW JERSEY, ASSIGNOR OF ONE-HALF TO STEPHEN W. BORDEN, OF SUMMIT, NEW JERSEY

WEIGHING MACHINE

Application filed February 5, 1929. Serial No. 337,714.

This invention relates to improvements in weighing machines for the weighing of materials in transit. The object of the invention is to provide a weighing machine which will indicate upon a dial, in pounds per hour or other similar units, the rate at which the material is being transported by belt or screw conveyor or other similar devices.

My invention is more particularly useful in cases where the material being handled is not of uniform weight per unit bulk, such for instance as coal. A device which will indicate the rate of flow in pounds per hour on a direct reading dial is particularly useful where there is involved another element of a system which must be co-ordinated therewith and in which the rate of flow of the other material being measured is also indicated in pounds per hour. One application of my weighing machine is found in connection with the weighing of powdered coal which is being fed to a furnace. In such cases the weight of air, per unit, of time, which it is desirable to supply the burners is dependent upon the weight of fuel, per unit of time, which is being fed to the burners, and where the rate of supply is not constant it is desirable to have the rate of flow, by weight, of both the fuel and the air continuously indicated upon suitable dials.

To accomplish the desired results I employ any type of weighing mechanism which is provided with a suitable platform to receive the load being weighed and which is constructed to indicate the weight of the load upon a dial or scale. Such mechanisms are well known in the art and are available in several commercial forms.

Upon such mechanisms I install a self contained motor driven conveyor of such capacity and operated at such speed as may be suitable for any particular application, but one essential feature is that the conveyor must be operated at a predetermined uniform speed, and in the form which I prefer this is accomplished by driving the conveyor by a synchronous electric motor connected to a source of electrical energy of uniform frequency. The weight of the conveyor and its driving motor are compensated for by proper counter balancing.

With the conveyor traveling at a uniform and definite speed the weight of the fuel which is upon the conveyor at any instant will be indicated upon the dial and since the conveyor is traveling at a constant speed the indications upon the dial will be directly proportional to the weight of material which the conveyor will transmit in any given period of time, and the indicating scale may therefore be calibrated to read directly in pounds per hour or other units representing the product of weight and time.

The electrical connections to the motor may be made by any of several methods known to the art, such as mercury cups, counter balanced spring conductors, or even simple extra flexible conducting cables, since the current required and therefore the cable sizes will be relatively small and if properly arranged will not interfere with the sensativeness of the weighing mechanism.

In the accompanying drawings like numerals refer to similar parts. The drawings do not show the actual construction of the weighing mechanism since this is old in the art and may be of any suitable form.

Fig. 1 is a schematic layout of a coal weighing machine.

Figs. 2 to 9 inclusive are details of the weighing machine.

Fig. 10 is a drawing of the scales of the remote indicating meters.

Fig. 1 is a schematic layout in which A is a disc feeder; B is a chute between A and C; C is a belt conveyor of a special type running at constant speed lying at an angle to reduce power consumption and mounted on special scale F, of which G is the indicator, H is a Selsyn transmitter motor and I the Selsyn remote indicator; D is a chute between the end of the compressor belt conveyor and pulverizer and E is the pulverizer.

Fig. 2 is a plan view showing the general arrangement of the special belt conveyor in which J is a synchronous motor, K the head pulley, N the gear case, L the tail pulley, M the idler pulley, X the frame.

Fig. 3 is the side elevation of the same special conveyor, the same letters as before indicating the same parts, O indicates a bearing for pulley L which bearing is adjustable.

Fig. 10 is a schematic drawing of the face of a combination meter for indicating the rate of flow of the fuel, primary air and secondary air, each meter being equipped with a special combination indicating dial and rating chart.

Figure 11 is a cross section of the conveyor belt and shows the normal slope of the coal thereon when operating at full capacity.

Figure 4:
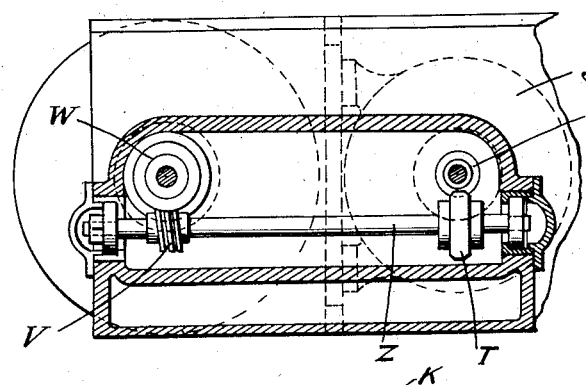
Fig. 4 is a detail of the gear case and gearing mechanism driven, the motor J is shown in the background and is connected through worm reduction gear S to gear T through shaft Z to worm V and gear W, to head pulley K.
Figure 5:
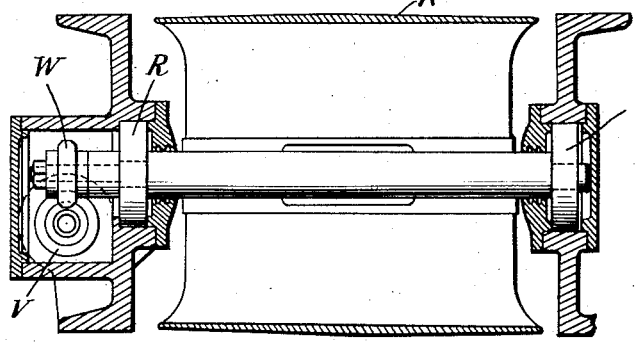
Fig. 5 is a cross section through the head pulley and this gearing which shows worm V and gear W with the two ball bearings R and the head pulley K.
Figure 6:
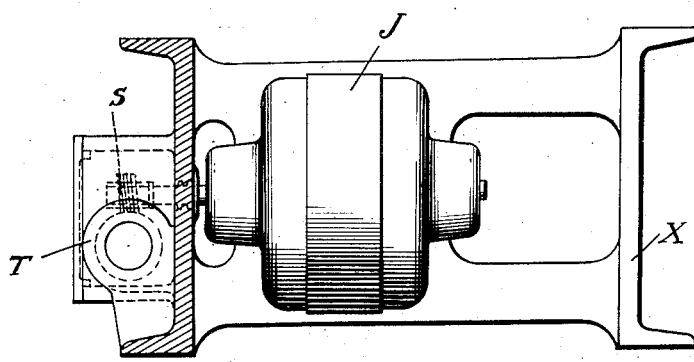
Fig. 6 is a cross section through the gear case showing the motor J, the worm gear S and the gear T, as well as the cross section of the frame X.
Figure 7:
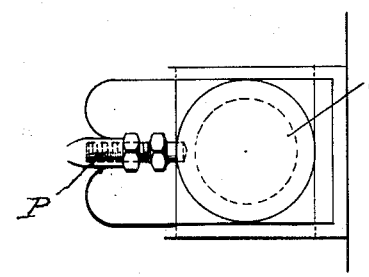
Fig. 7 is a detailed drawing showing at P the bearing adjustment for bearing O.
Figures 8, 9:
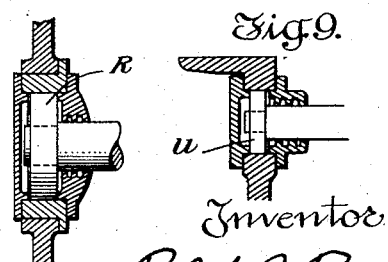
Fig. 8 is a detail of the ball bearing R used on both pulleys K and L and may apply to any of these four ball bearings.
Fig. 9 shows the bearing U for the idler pulley N.

As used in a steam electric station the remote indicating dial I is mounted on the control board together with other dials among which are two dials indicating the rate of flow, in pounds per hour, of the primary and secondary air for the furnace burners. With these indicators before him the operator is able to proportion the mixture exactly in accordance with combustion requirements prior to combustion and not after combustion which is the present practice. To assist in this operation, a scale graduated in per cent rating is added to each of the above instruments, each scale registering from say 0 to about 125% rating. The operator makes the necessary adjustment to cause each instrument to indicate the same rating and when he has done this he will have the correct mixture of primary and secondary air and fuel. Some or all of the necessary adjustments may be carried out automatically.

Remote indicating dials for each of the three measuring devices are preferably assembled in one case as shown schematically in Fig. 10. The percent rating at which the plant is operating at any particular moment is made known to the operator by means of a suitable instrument, such as a load indicator, and the rate of flow of the fuel, primary air and secondary air, as indicated by the three meter dials, is kept constantly adjusted to correspond with the percent rating, thus insuring an accurate, pre-determined mixture of fuel and air of such proportions as may be desired.

However, the amount of air which it is desirable to furnish with each pound of fuel depends upon the number of B. t. u. contained in the fuel, and upon the excess air characteristics of the furnace. As shown in Fig. 10 the scale for the fuel motor is provided with a hair line adjustable over a scale calibrated in B. t. u.'s per pound and the operator adjusts this hair line in accordance with the B. t. u. characteristics of the fuel which is being burned at any particular time. By reading the dial on the hair line he obtains the correct percentage of burner capacity for that particular fuel. In a similar manner the scales for the primary and secondary air meters are provided with hair lines adjustable on a scale of excess air, thus providing an adjustment for variations in the excess air characteristics of the furnace.

What I claim is:—

1. The combination of a direct reading weighing mechanism and a synchronous electric motor driven conveyor, the conveyor together with its driving motor being mounted upon the weighing platform of the weighing mechanism.

2. The combination of a self-indicating weighing machine and an indicating dial calibrated in units of the product of weight and time and a conveyor traveling at a constant speed, mounted upon the weighing mechanism in a position to be weighed thereby the mechanism being counterbalanced for the weight of the conveyor.

In testimony whereof I have signed my name to this specification.

RALPH C. ROE.